April 2, 1946.  H. H. DUNKLE  2,397,597
GASKET
Filed July 17, 1944

INVENTOR.
HEBER H. DUNKLE
BY
HIS ATTORNEY.

Patented Apr. 2, 1946

2,397,597

UNITED STATES PATENT OFFICE 2,397,597

GASKET

Heber H. Dunkle, Raritan Township, Middlesex County, N. J., assignor to Goetze Gasket & Packing Co., Inc., New Brunswick, N. J., a corporation of New Jersey Application July 17, 1944, Serial No. 545,246

1 Claim. (Cl. 288—23)

The present invention relates to gaskets and is concerned primarily with an all metal corrugated gasket.

At the present time there is a gasket which is meeting with fairly widespread usage and which is intended to be improved by this invention. This gasket consists essentially of a layer of asbestos which is firmly embedded between two layers of corrugated metal. The asbestos functions as a filler between the layers of metal and one metallic layer has its inner and outer edges turned over to provide peripheral flanges which maintain the assembled relation. While certain advantages have been found to attend the use of this gasket with the asbestos filler, it has proven to be unsatisfactory under certain conditions, particularly for high temperature service and in installations where insufficient means have been provided to seal the gasket for high pressure service. Thus when the temperature to which the gasket is subject begins to range over 950° F. the asbestos breaks down which results in a complete failure of the gasket. Moreover, when pressure or force is applied to the gasket in order to seat it, and thus seal the assembly against leakage, there is little if any flow of the metal surfaces of the gasket due to the fact that the force exerted is for the most part absorbed by the soft filler element.

It is now well recognized that the best sealing effects may be obtained from a metallic gasket if the metal thereof is caused to flow under pressure and thus fill the interstices and gaps of the surfaces to be sealed. It is evident that with the asbestos filler present and pressure applied to the gasket little if any of this pressure will be effective to cause the flow of metal which is such a desirable factor.

With the foregoing conditions in mind this invention has in view as its foremost objective the provision of a gasket comprising two metallic corrugated layers which are assembled in meeting or nested engagement. Those skilled in the gasket art have recognized the great advantages which would doubtlessly attach to an all metal gasket of this type if properly assembled and constructed. Accordingly, certain attempts have been made to provide an all metal corrugated gasket of this character. However the known efforts in this direction have not been entirely satisfactory due to certain insufficiencies.

With this condition in mind, this invention has in view, as a further more detailed, yet highly important object, the provision of an all metal corrugated gasket of the type above noted in whch one metallic layer is of greater radial dimension than the other so as to provide portions extending beyond the inner and outer peripheral edges of the other layer. These portions are folded back into U shaped retaining flanges which are effective on both the inner and outer peripheries to maintain the assembled relation.

The gasket of the type with which this invention is concerned is ordinarily clamped between two surfaces which are to be sealed. It is, therefore, of the utmost importance that there be symmetry and a balanced condition over the entire gasket surface. This is obtained by the flanged arrangement above described because there is exactly the same thickness of metal at the outer periphery as there is at the inner periphery. Where this outer U shaped flange is omitted, the pressure applied to the gasket would flatten out the corrugations and a large amount of the sealing effect would be lost. It is further noted that in a gasket of this type, the presence of the flange at one periphery complements the flange on the other periphery and the two together tend to prevent dishing or distortion of the clamping members of the gasketed assembly which is a condition which would obtain if the outer flange were omitted. In a gasket made in accordance with the precepts of this invention, the inner and outer peripheral flanges are maintained concentric at all times.

A further object in view is the provision of an all metal corrugated gasket of the type above noted in which the layers are arranged to provide a slight clearance therebetween which results in the incorporation of a required degree of resiliency or "cushioning effect" into the gasket.

Various other more detailed objects and advantages of the invention such as arise in connection with carrying out the above noted thoughts in a practical embodiment will in part become apparent and in part be hereinafter stated as the description of the invention proceeds.

The invention therefore comprises an all metal corrugated gasket consisting of two metallic corrugated layers of a formation defining an opening and one of which is formed with bent-over U shaped flanges which encompass the other layer at the inner and outer peripheral edges to maintain the assembled relation.

For a full and more complete understanding of the invention, reference may be had to the following description and accompanying drawing wherein.

Figure 1:
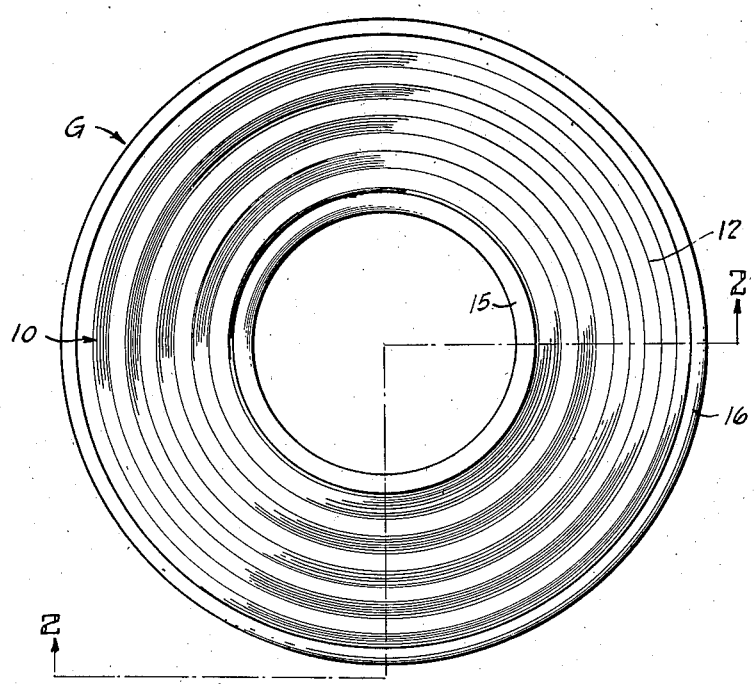
Figure 1 is a plan view of an all metal corrugated gasket made in accordance with the precepts of this invention.
Figure 2:
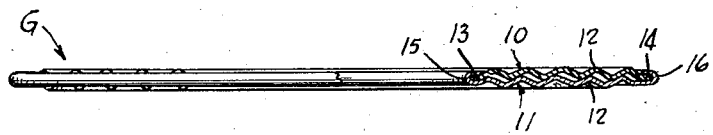
Figure 2 is a view taken at right angles to the showing of Figure 1 with a quarter of the gasket cut away and removed to bring out the structural details thereof.

Before referring to the drawing, wherein like reference characters denote corresponding parts, attention is called to the fact that the present invention is herein illustrated and described in conjunction with a gasket consisting of only two layers, as this is the minimum number possible in this type of structure. However, it is to be distinctly understood that this number of layers is no limitation on the invention, as a gasket including more than two layers may be made and still accurately conform to the tenets and teachings of this invention.

Upon referring to the drawing it will be noted that the gasket is shown in its entirety in Figure 1 and is referred to as such by the reference character G. The gasket G comprises a pair of layers 10 and 11. For the purpose of this specification, the layer 10 is referred to as the upper layer and the layer 11 as the lower layer. The main body portion of each of the layers 10 and 11 is formed with a series of concentric corrugations 12 and it will be noted that the corrugations 12 of the layer 10 are nested or received in the corrugations 12 of the layer 11. The extent or degree to which this nesting or seating is carried out determines the resiliency or "cushioning effect" of the gasket. The less seating there is, the greater will be the "cushioning effect." On the other hand, if the nesting or interfitting is carried out to a maximum there will be but little "cushioning effect" which in some instances may be desirable.

The upper layer 10 has an inner peripheral edge identified as 13, and an outer peripheral edge designated 14. The lower layer 11 is of greater radial dimension than the outer layer 10 so as to provide portions extending beyond the edges 13 and 14. That portion which ordinarily extends inwardly beyond the inner peripheral edge 13 is turned back over this edge portion 13 to provide a U shaped flange 15 which tightly encloses the inner edge portion 13. Likewise that portion of the bottom layer 11 which ordinarily would extend beyond the outer edge 14 is turned back over this edge portion 14 to form an outer U shaped flange 16.

It will be noted in each instance that the outer and inner edges are tightly enclosed by the U shaped flanges. Thus, at the inner and outer peripheries there is an extra layer of metal as compared to the remainder of the gasket construction. However this extra layer does not increase the thickness of the gasket beyond the dimension determined by the corrugations. Thus when the gasket is clamped between the surfaces to be sealed the corrugations will become effective thereon and are subject to the pressure applied.

As explained above, a gasket made in accordance with this invention may include three or more layers. When a three layer arrangement is employed certain advantageous opportunities are offered to adapt the gasket to certain particular uses. Thus the central or intermediate layer which might be considered as the "filler" may be of a hard or hardened metal and will take the usual corrugated form. This filler will be sheathed by outer layers of a softer metal which also will be corrugated. These outer layers which "clad" the filler may be either of the same or of a different metal.

Figure 3:
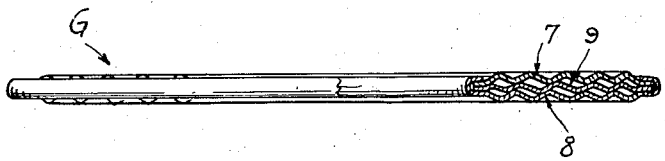
Figure 3 is a view similar to Figure 2 of a modification.

For example, where a soft corrugated lead or copper gasket is required because of corrosive conditions, either of these soft metals might, if unsupported, be squeezed out. However, by using a corrugated filler of hard or hardened steel and jacketed or sheathed with either corrugated lead or copper the gasket would be reinforced. Such a modification is shown in Figure 3 in which the intermediate layer 9 is of hard or hardened steel while the outer layers 7 and 8 are of lead or copper.

A further advantage attending this three ply construction is tied up with the fact that the metals which are now available for high temperature service do not have sufficient resistance to creep if used in thickness suitable for fabrication into gaskets by rolling or drawing operations which are necessary to form the lower layer of the corrugated design. By using a corrugated filler, as above indicated, of thicker and/or harder or stiffer material the gasket would be reinforced. Thus the outer layers might be made from more easily formed and thinner sheets and resistance to creep would not be impaired.

Still a further advantage in favor of this multi layer construction is that the multiple layers allow the fabrication of the gasket in almost any combination of gasket thickness and corrugation practically without loss of rigidity.

While preferred specific embodiments of the invention are hereinbefore set forth, it is to be clearly understood that the invention is not to be limited to the exact constructions illustrated and described because various modifications of these details may be provided in putting the invention into practice within the purview of the appended claim.

What is claimed is:

A metallic gasket of spongelike formation or the like comprising a disc with a central opening and concentric corrugations therein, a second disc also having concentric corrugations the edges of which extend around the edges of the former disc holding the discs in assembled relation at both their inner and outer edges; and a third disc also having concentric corrugations interposed between the two former discs, said gasket characterized in that the corrugations of the different discs are not in registering relation providing open areas therebetween.

HEBER H. DUNKLE.